United States Patent
Sparrman et al.

(10) Patent No.: US 6,959,065 B2
(45) Date of Patent: Oct. 25, 2005

(54) REDUCTION OF LINEAR INTERFERENCE CANCELING SCHEME

(75) Inventors: Erik Sparrman, Tumba (SE); Stefan Parkvall, Stockholm (SE); Alex Murillo Barrera, Valencia (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 879 days.

(21) Appl. No.: 09/839,510

(22) Filed: Apr. 20, 2001

(65) Prior Publication Data

US 2002/0154713 A1 Oct. 24, 2002

(51) Int. Cl.⁷ .............................. H03K 5/01; H03K 6/04; H03D 1/04; H03D 1/06; H04B 1/10; H04L 1/10
(52) U.S. Cl. ..................... 376/346; 375/144; 375/148; 375/348
(58) Field of Search .................... 375/346; 370/310, 370/342, 335

(56) References Cited

U.S. PATENT DOCUMENTS

| | | | | |
|---|---|---|---|---|
| 5,533,012 A | * | 7/1996 | Fukasawa et al. | 375/148 |
| 5,724,378 A | * | 3/1998 | Miki et al. | 375/148 |
| 6,067,333 A | * | 5/2000 | Kim et al. | 375/346 |
| 6,137,785 A | * | 10/2000 | Bar-Ness | 370/328 |
| 6,212,223 B1 | * | 4/2001 | Okamoto | 375/150 |
| 6,282,233 B1 | * | 8/2001 | Yoshida | 375/148 |
| 6,404,759 B1 | * | 6/2002 | Shoji | 370/342 |
| 6,473,415 B1 | * | 10/2002 | Kim et al. | 370/342 |
| 6,609,008 B1 | * | 8/2003 | Whang et al. | 455/522 |
| 6,661,835 B1 | * | 12/2003 | Sugimoto et al. | 375/148 |

(Continued)

FOREIGN PATENT DOCUMENTS

| | | |
|---|---|---|
| EP | 0 671 821 A2 | 9/1995 |
| EP | 1 124 346 A1 | 8/2001 |
| WO | WO 94/16513 | 7/1994 |
| WO | WO 00/49724 | 8/2000 |
| WO | WO 00/51249 | 8/2000 |

OTHER PUBLICATIONS

Despread–respread multi–target constant modulus array for CDMA systems Rong, Z; Petrus, P.; Rappaport, T.S.; Reed, J.H.; Communications Letters, IEEE vol. 1, Issue 4, Jul. 1997 Pages(s):114–116.*

Reducing capture effects in despread–respread multi–target adaptive arrays in CDMA systems Cavalcanti, F.R.P.; Romano, J.M.T.; Global Telecommunications Conference, 1999. GLOBECOM '99 vol. 4, 1999 Page(s):2112–2116 vol. 4.*

Block based RLS de–spread re–spread multitarget array: algorithm and performance Zhimin Du; Ping Gong; Weiling Wu; Vehicular Technology Conference, 2001. VTC 2001 Spring. IEEE VTS 53rd vol. 1, May 6–9, 2001 Page(s):190–193 vol. 1.*

Wijting, et al.; "*Groupwise Serial Multiuser Detectors for Multirate DS–CDMA*"; XP–002141307; IEEE, May 1999; pp. 836–840.

Standard Search Report; RS 106983; Dated Nov. 26, 2001.

*Primary Examiner*—Stephen Chin
*Assistant Examiner*—Harry Vartanian (57) ABSTRACT

A system, method and apparatus for demodulating a received signal using a configurable receiver. The receiver performs the demodulation of a signal according to a selected interference cancellation demodulation scheme. The same receiver can be configured, by setting certain parameters, to behave as a successive interference cancellation (SIC) scheme receiver, a parallel interference cancellation (PIC) scheme receiver, or a hybrid interference cancellation (HIC) scheme receiver. In another aspect of the present invention, the receiver performs its demodulation operation using a single interference cancellation unit (ICU). In addition, the ICU's despreading and respreading functions may be performed by the same processing element.

11 Claims, 8 Drawing Sheets

U.S. PATENT DOCUMENTS

| | | | |
|---|---|---|---|
| 6,667,964 B1 * | 12/2003 | Seki et al. | 370/342 |
| 6,741,634 B1 * | 5/2004 | Kim et al. | 375/144 |
| 6,760,315 B1 * | 7/2004 | Esmailzadeh et al. | 370/310 |
| 2001/0053177 A1 * | 12/2001 | Papasakellariou | 375/142 |
| 2002/0051433 A1 * | 5/2002 | Affes et al. | 370/335 |
| 2002/0061080 A1 * | 5/2002 | Richards et al. | 375/346 |
| 2002/0131534 A1 * | 9/2002 | Ariyoshi et al. | 375/346 |
| 2004/0202137 A1 * | 10/2004 | Gerakoulis | 370/335 |

* cited by examiner

REDUCTION OF LINEAR INTERFERENCE CANCELING SCHEME

BACKGROUND OF THE PRESENT INVENTION

1. Field of the Invention

The present invention relates generally to a Code Division Multiple Access (CDMA) system and particularly to complexity reduction of linear interference cancellation schemes for CDMA systems.

2. Background of the Present Invention

In a CDMA system, several data sequences can be sent in parallel using different spreading codes. The spreading codes are preferably orthogonal to each other to enable better detection by the receiver. The receiver detects a desired signal from several data sequences by a despreading process using the spreading code associated with the desired received signal. The spreading codes used for a CDMA system are chosen to have a relatively low cross-correlation between any two sequences in the set. Each user in a CDMA system can in parallel be sending several different data sequences, where each data sequence is part of different signals, each signal being associated with a specific spreading code. In an ideal case, the spreading codes are orthogonal to illuminate the cross-correlation between the signals. However, in a non-ideal world, interference nonetheless occurs in the CDMA system due to cross correlation between the spreading codes assigned to users, but should be sufficiently low to provide fairly good performance. In the downlink channel, orthogonality is lost due to various distortion aspects affecting the transmitted signal, such as multipath propagation. Hence, the spreading codes lose their orthogonality with each other which results in performance degradation.

In uplink communication, the codes will never be orthogonal in view of the lack of synchronization between different data streams since there is no control on the propagation delay from individual users which is required to ensure orthogonality. Therefore, the transmitted data sequences can not be perfectly recovered by a RAKE receiver. As is well known in the art, there are techniques to improve the receiver performance, such as interference cancellation techniques, interference suppression techniques and/or multiuser detection techniques.

As is well known to those skilled in the art, Interference Cancellation (IC) is performed to cancel the interference caused by other data streams on the data streams of interest. Most commonly, the interference cancellation techniques used are successive interference cancellation (SIC) and parallel interference cancellation (PIC) or combinations thereof.

Figure 1:
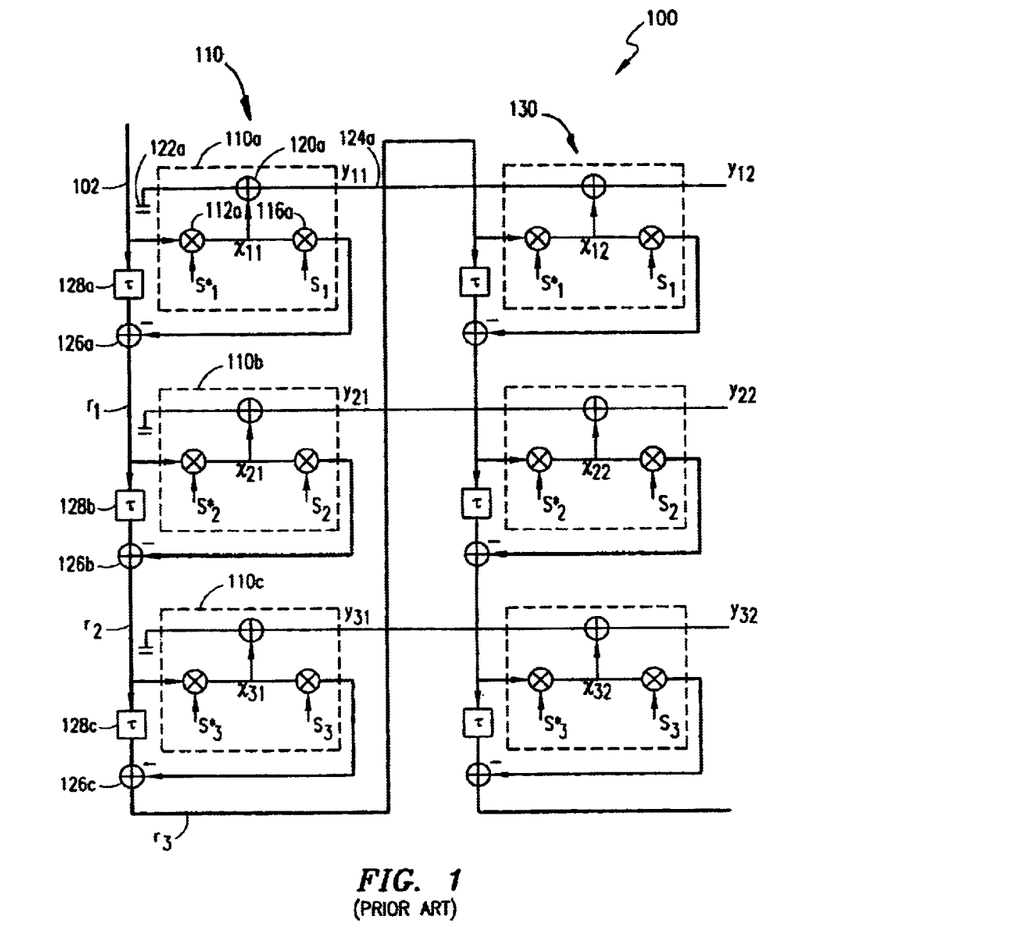
FIG. 1 illustrates a conventional successive interference cancellation receiver for detecting three codes and having two stages.

FIG. 1 illustrates a conventional successive interference cancellation (SIC) receiver unit for three codes (k) (i.e., three user signals) and two stages (110, 130): i.e., interference canceled twice. Symbols for a data stream are detected and used to cancel their influence on the received symbols of other data streams before detecting the next data stream symbols. User data streams' influence are preferably canceled in order of their descending signal strength, since the strongest data stream contributes the most to the multiple access interference (MAI) in the system. Thus, the influence of the strongest signal received for a data stream is canceled from all other data streams. Another reason for canceling the strongest signal first is that the data estimate in that signal usually is the most reliable one. The interference cancellation process can be repeated several times e.g., two stages as shown in FIG. 1, to improve the reliability of the data estimation.

Considering the first stage of the SIC scheme, the data sequence r is received 102 by the receiver and supplied to an Interference Cancellation Unit (ICU) 110a associated with the first spreading code, shown within dashed lines. The data sequence 102, received by the ICU is despread 112a by a spreading code convolved with the channel estimate of user channel (hereinafter referred to as convolution sequence and denoted $S_K$), and is preferably normalized such that $S_k'S_k=1$, where $S_k'$ is the complex conjugate of $S_k$. As shown In FIG. 1, the received data sequence is despread 112a by $S_k'$, RAKE receiver function, and added 120a to the previously detected soft values (previously stored RAKE receiver result) 122a to form the estimate symbol of the user 124a. However, in the first stage there is no previous detected soft values, and the soft values of the despread sequence $(X_{11})$ are the same as the soft values of the despread sequence $(Y_{11})$ after the addition operation 120a. The despread sequence $(Y11)$ is stored to be used in later stages. Meanwhile, the soft values (result of RAKE receiver function 112a) are respread 116a to enable subtraction 126a from the received data sequence r (102) used for the second code. After subtracting the respread soft values from the received data sequence, the result is used in a similar process as described above for the second user code using the ICU 110b. Specifically, the output respread signal of the second ICU 110b is subtracted 126b from the data sequence r1 to produce data sequence r2 having the first and second user estimate influence removed therefrom. A further similar process is used for a third user using ICU 110c. After all users' symbol estimates have been removed from the received signal, the remainder (r3) is employed to perform the whole interference cancellation operation described above, a determined number of stages thereafter. As shown in FIG. 1, a second stage 130 is employed which performs the same operations as the previous stage. The second stage is mainly used to correct the inaccuracy of each user's symbol estimate, which is due to the non-orthogonality between the codes. The non-orthogonality between the codes prevents the precise contribution of a user's signal to be extracted exactly while ignoring the contribution of other users signals. However, the contribution detected in the second stage is added to the contribution extracted in the first stage and used to provide a better estimation. Processing delays 128a, 128b and 128c are introduced in the system to delay the data sequence before the subtraction operations 126a, 126b and 126c for each code interference cancellation operation and at each stage (iteration). These delays account for the time used in the despreading and the respreading operations in the ICU. The despread data sequences within the ICUs for each user and at each stage are soft values, and there is no hard decision (discrete values) or other mapping function applied inside the ICUs. It should be understood that despite the fact that the ICUs do not perform a hard decision, after the last stage, a hard decision should be performed to transform the last accumulated estimate into a symbol decision. This can be performed by a hard-decision device (not shown in the figure).

Figure 2A:
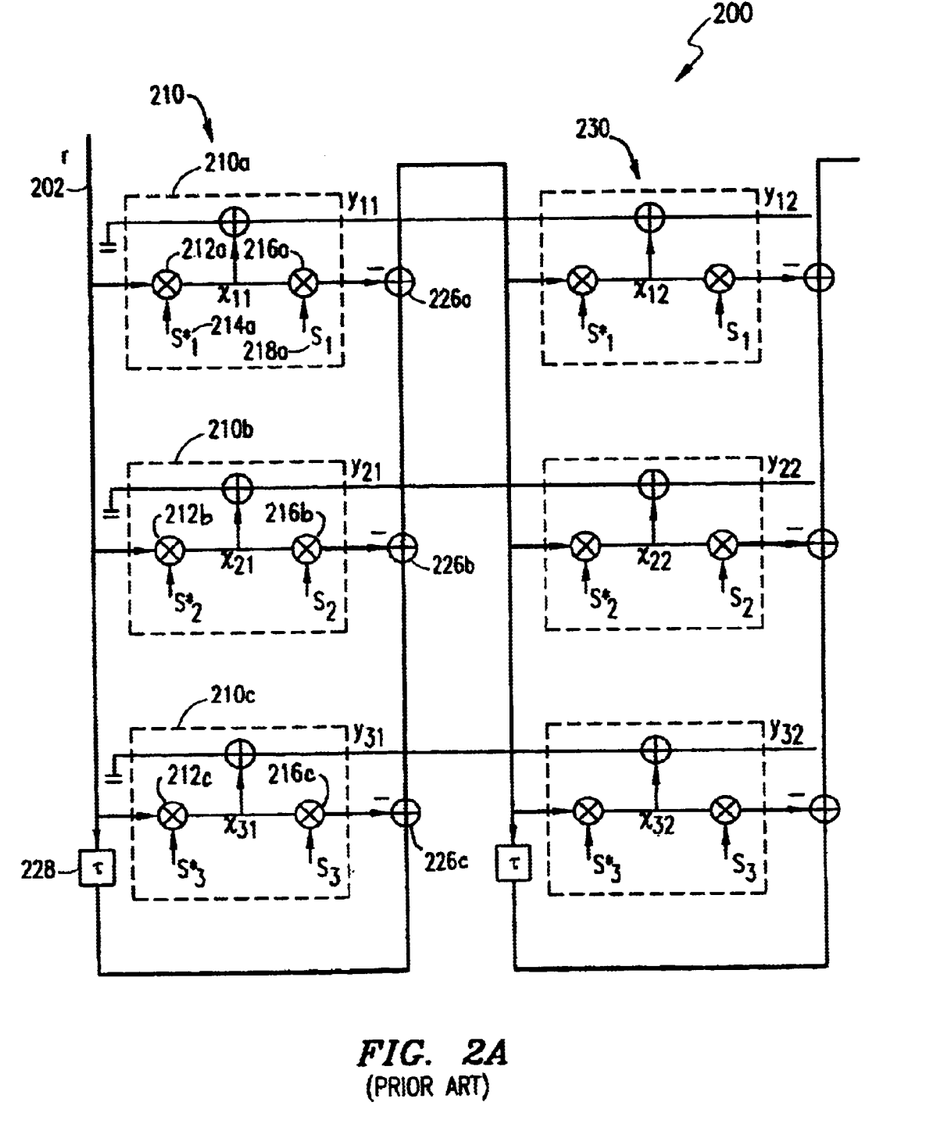
FIG. 2A illustrates a conventional parallel interference cancellation receiver for detecting three codes and having two stages.

FIG. 2A illustrates a similar receiver implementing a parallel interference cancellation (PIC) scheme. The PIC scheme is similar to the SIC scheme with minor differences. The received data sequence r 202 is supplied to all the ICUs (210a–c) corresponding to all the users's at a specific stage, which reduces the processing delay in the receiver compared to the SIC scheme. The received data sequence r 202 is despread (212a–c) and respread (216a–c), as explained above, by all user's codes before the influence/contribution of all the user's codes signals are subtracted (226a–c) concurrently from the received data sequence r 202. In other words, all the ICUs, at each stage, despread the same data sequence before their contribution is subtracted. Consequently, the processing delay 228 introduced to compensate for the delay in the despreading and respreading operations is reduced to only one delay for all the users at each stage compared to multiple delays in the SIC scheme.

Figure 2B:
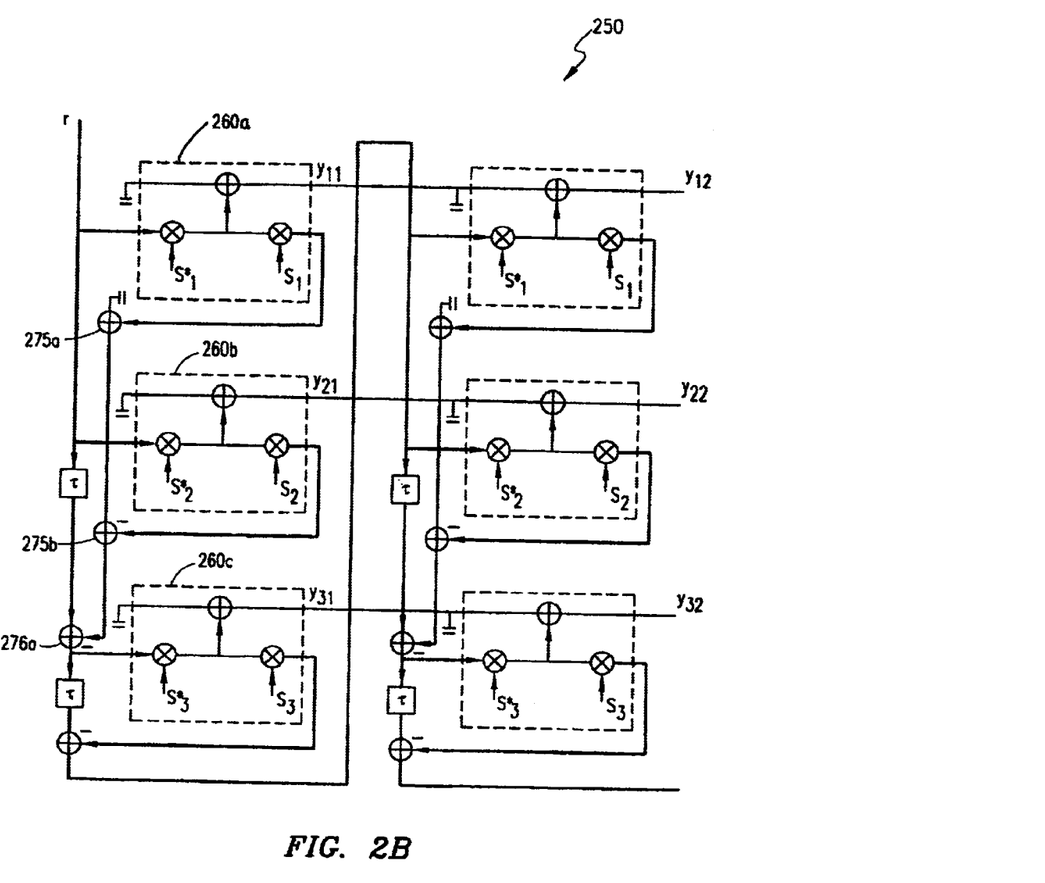
FIG. 2B illustrates a conventional hybrid interference cancellation receiver for detecting three codes and having two stages.

As is understood by those skilled in the art, both the SIC and the PIC can be combined to form a hybrid interference cancellation (HIC) scheme which performs detection of groups of users signals successively. Within each group, the detection is performed in parallel. FIG. 2B illustrates a conventional receiver implementing the HIC scheme. The data sequence is received and detected for the first two spreading codes using the two ICUs 260a and 260b in a similar way as the PIC. The estimate of the first two users' symbols are added together using adders 275a and 275b. This result is the combination of the effect of the two users' symbols on the data sequence. This result is then subtracted 276a to remove the contribution of these two users' symbols. The modified data sequence r2 is then used by the third ICU 260c to estimate the third user's symbol and subtract/remove the estimated influence from the modified data sequence r2. The process is repeated depending on the number of stages implemented. The HIC unit shown in FIG. 2B detects and removes the influence of the first two users in parallel and then detects and removes the influence of the third user.

The SIC, PIC and HIC schemes, described above, have several disadvantages and limitations when implemented in a receiver. One of the disadvantages is that for every user in the system, there has to be at least one ICU. This increases the hardware requirements in a receiver system with multi-users and/or multi-stages. Another shortcoming of the above described conventional schemes is that all detected data sequences are propagated and stored, which is not required in downlink communication in which only one or a few data sequence streams are of interest at one terminal. A further disadvantage is the inflexibility of the presented implementation of the schemes, as different receiver structures are required to realize the SIC, PIC and HIC schemes. Yet another disadvantage is the use of different blocks (processing elements) within the ICU to perform the despreading and the respreading operations, thus requiring a greater amount of hardware.

It is therefore an object of the present invention to overcome the disadvantages and shortcomings described above in addition to providing other novel features described and shown hereinafter.

SUMMARY OF THE INVENTION

The present invention is directed to a system, method and apparatus for demodulating a received signal using a configurable receiver. The receiver performs the demodulation of a signal according to a selected interference cancellation demodulation scheme. The same receiver can be configured, by setting certain parameters, to behave as a successive interference cancellation (SIC) scheme receiver, a parallel interference cancellation (PIC) scheme receiver, or a hybrid interference cancellation (HIC) scheme receiver. In another aspect of the present invention, the receiver performs its demodulation operation using a single interference cancellation unit (ICU). In addition, the ICU's despreading and respreading functions may be performed by the same processing element.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The receiver according to the preferred embodiment of the present invention, using a single structure, realizes a selected interference cancellation scheme. The same single structure, i.e., hardware components, are being utilized as a flexible receiver capable of being adjusted, using certain parameters, to perform the desired interference cancellation scheme. Thus an advantage of the present invention's receiver is a reduction in the number of hardware components (elements) used. This, in addition to other advantages, as will be clear hereinafter, is an incentive for using the present invention's receiver. The present invention also allows only one ICU to be used in each of the desired interference cancellation schemes, thus further reducing the hardware requirement in the system. As an additional feature, the ICU also performs two operations using only one multiplier, further reducing the hardware needed. Thus, the flexible receiver, as mentioned above and described in detail hereinafter, makes full utilization of hardware components, and implements efficient interference cancellation and demodulation methods for received data sequences.

Figure 3:
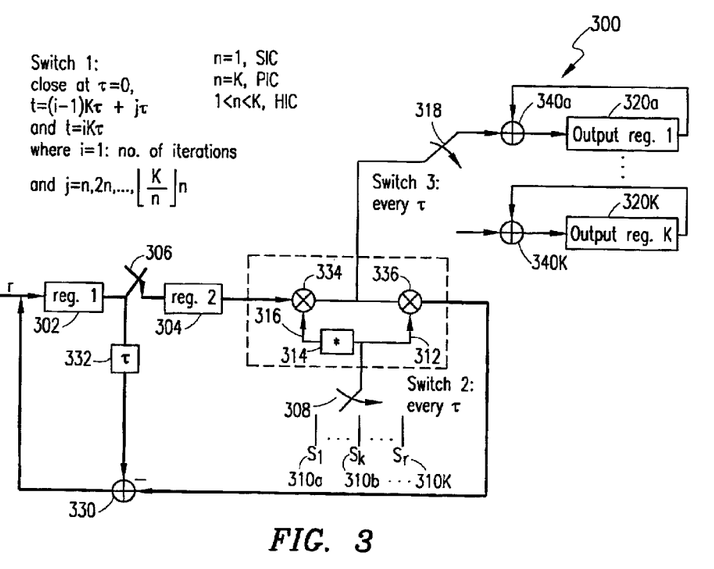
FIG. 3 illustrates SIC, PIC and HIC realized with one ICU according to a preferred embodiment of the present invention.

FIG. 3 illustrates a receiver according to a preferred embodiment of the present invention that realizes either the SIC, PIC or HIC schemes using one ICU. The receiver contains two registers, i.e., register 1 (302) and register 2 (304), and a switch 306 therebetween, which together are used in a manner described hereinafter to select either the SIC, PIC or HIC schemes. This selection of either one of the three schemes is performed by closing switch 1 (306) at intervals determined by a variable n shown below in Equation 1.

Close switch 1 at:

$$t=0,$$
$$t=(i-1)K\tau+j\tau, \text{ and}$$
$$t=iK\tau \quad (1)$$

where i=1:no. of iterations, K=no. of spreading codes used, τ=processing delay and j=n, 2n, . . ., ⌊K/n⌋·n.

When the variable n is set equal to 1, the SIC scheme is used. When the variable n is set equal to K, the PIC scheme is used. Otherwise, when the variable n has a value greater than 1 but less than K, the HIC scheme is used. The value of n is preferably set by the system depending on which scheme needs to be implemented. Switch 1 (306) is closed at time instances, determined by Equation (1), depending on the variable n used. Thus, the value of the variable n sets the interference cancellation scheme implemented.

In the receiver's ICU, a second switch 308 is used to switch between the convolution sequences 310a-K of different spreading codes. When a first signal needs to be detected, the second switch 308 moves to a first location 310a. The switch 308 will move to a second location 310b corresponding to a second convolution code when a second signal needs to be detected, and so on. However, it should be understood that more than one signal may be associated with each user, wherein each signal will have its own convolution code. The input from the second switch 308 is split into two branches, one being the convolution sequence ($S_k$) 312, and the other being its complex conjugate ($S_k^*$) 316.

The received data sequence symbol is first loaded into register 1 (302), and then switch 1 (306) transfers the loaded symbol to register 2 (304) at the specified time instances. The symbol in register 2 (304) is despread (334) by the complex conjugate (314) of the convolution sequence $S_k$ corresponding to the data sequence of the user. The result of the despreading operation, using a user spreading code, is optionally saved in an accumulator associated with the user's spreading code. The function of saving the despread sequences is performed by a third switch 318 which switches between accumulators 320a-K for storing/accumulating the despread sequence in select registers. Each of the registers/accumulators corresponds to a different spreading code. In other words, a data sequence associated with a spreading code is only stored in the accumulator associated with that same spreading code. Each accumulation operation (340a, . . . , 340K) is performed to add the contribution of a despread data sequence, by a user's spreading code, captured at all stages for a received data sequence. This accumulation is similar to the addition operation performed in several stages in conventional ICUs. For example, the addition operations 120a and 140a and any other addition operation in different stages thereafter for the same user spreading code, shown in FIG. 1, can be performed by adder 340a, using output register 1 (320a) as a storage/accumulator unit.

In the meantime, the despread sequence of the despreader 334 is respread 336 by the convolution sequence $S_k$. The output respread sequence is subtracted (330) from a time delayed version (332) of the original sequence and the result loaded into register 1. The above described process is then repeated for each spreading code and for each stage using the same hardware elements.

Figure 4:
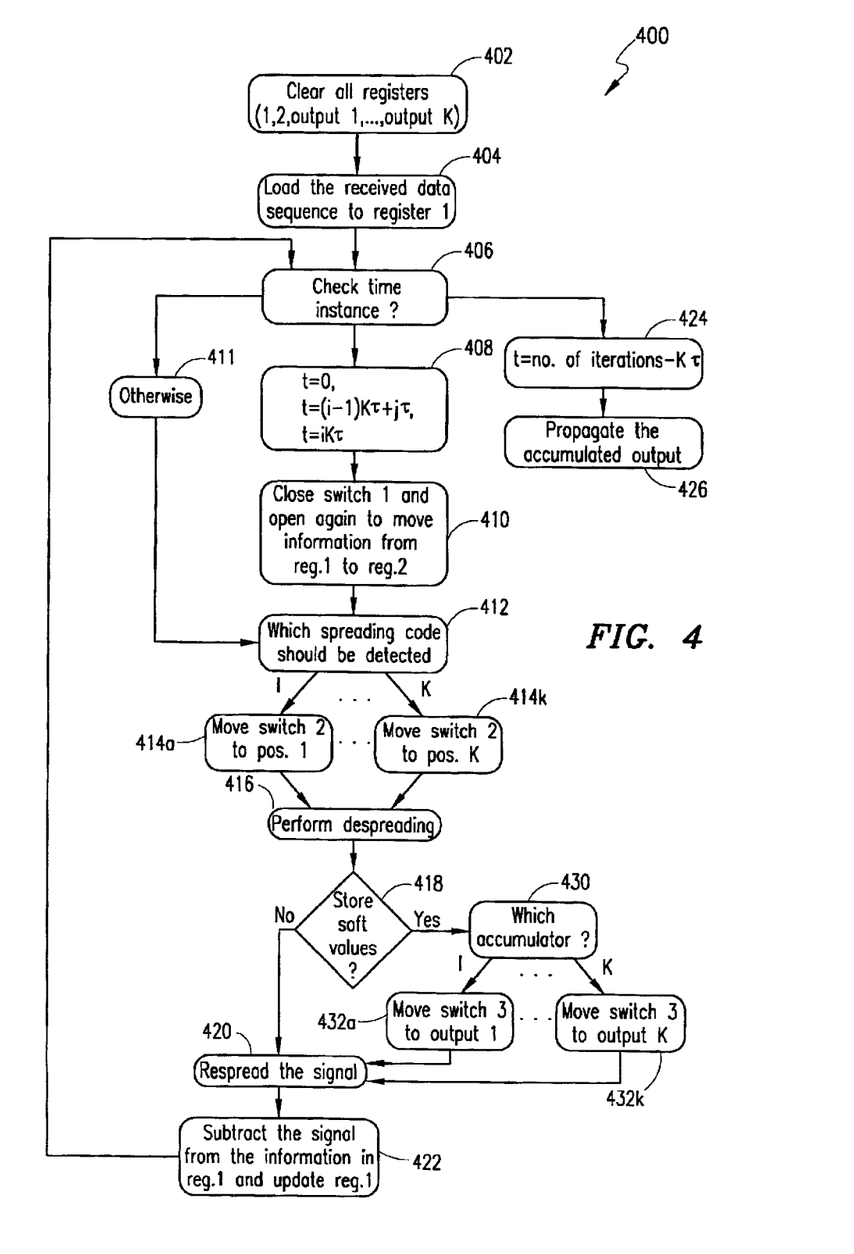
FIG. 4 is a flow chart illustrating the function of the interference cancellation scheme of FIG. 3.

FIG. 4 illustrates a flow chart of the functions of the receiver illustrated in FIG. 3. The registers are first cleared (402) in the receiver. The data sequence is then loaded into register 1 (404). The time instance is then checked (406). If the time is either t=0, t=(i−1)Kτ+jτ, or t=iKτ (408), switch 1 is closed and then opened to shift (410) the information contained in register 1 to register 2. However, if the time instance does not satisfy the time instances in 408 or in 424 described hereinafter, the receiver does not close switch 1 (step 411) and proceeds with step 412. The receiver then determines which spreading code needs to be detected (step 412), and the second switch moves to the correlation sequence position associated with the desired spreading code (414a-K). The receiver then performs the despreading (416), and the soft values (despreading or RAKE function result) of the despread signal, if they need to be stored, are stored (418) in a selected accumulator associated with the spreading code (430) by moving switch 3 to the position associated with the spreading code (432a-K), i.e., accumulator 1 to K. The despread signal, whether stored or not, is respread (420) and subtracted (422) from the information in register 1. A delay is introduced in the output of register 1 to account for the processing delay of the interference cancellation operation described above. Register 1 is then updated with the sequence resulting from the subtraction of the respread sequence from the original content of register 1. However, at time instances when all the iterations are completed for all spreading codes, i.e., t=number of iterations*Kτ (424), the accumulated output is propagated elsewhere in the receiver (426), such as for example, to a unit that decodes error correcting codes.

Figure 5:
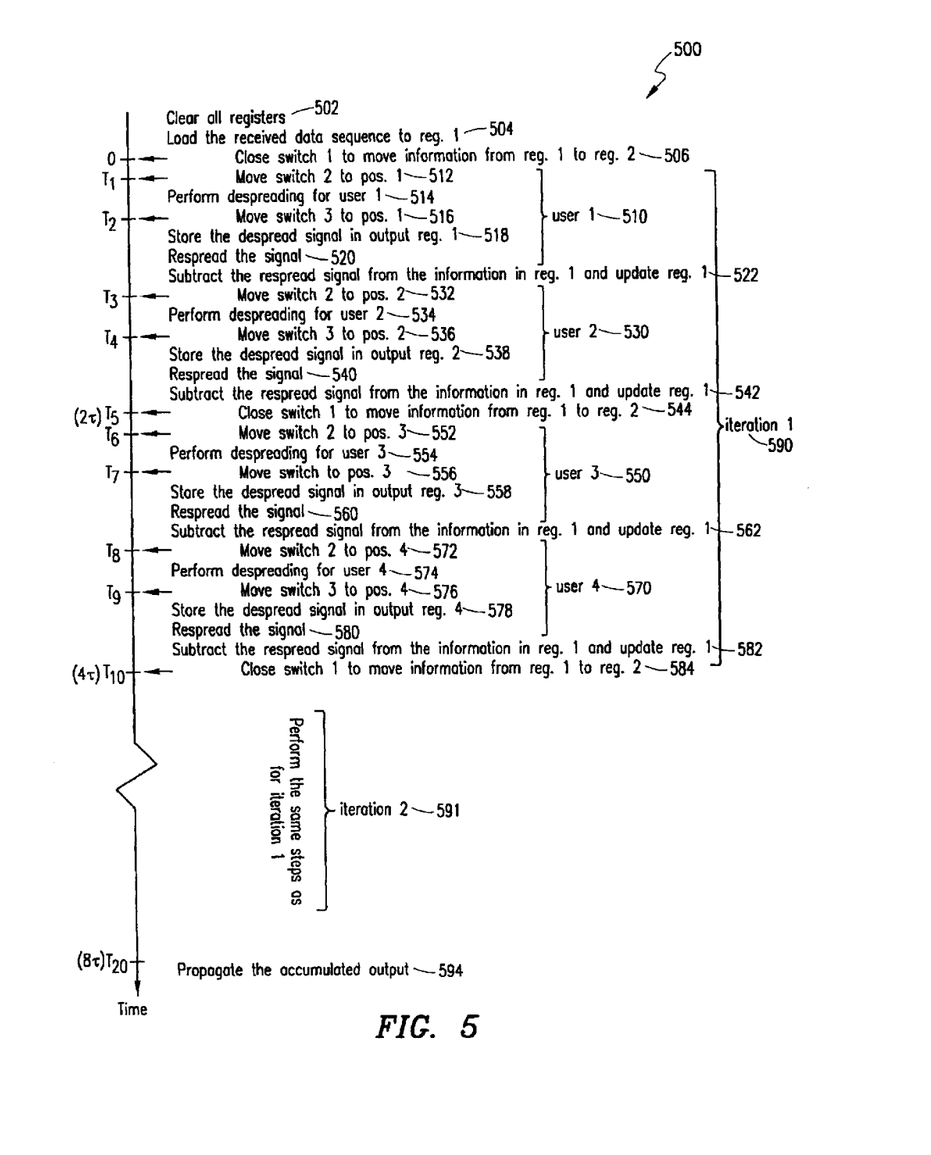
FIG. 5 illustrates a timing diagram of the interference cancellation scheme of FIG. 3.

FIG. 5 illustrates an exemplary timing diagram for the operation of the receiver of FIG. 3. The number of users in this example is four, i.e., K=4, and the number of iterations is set equal to two. The variable n is set equal to 2, which makes the receiver (300) a HIC scheme receiver. Hence, users in this receiver are detected in groups of two. As mentioned previously, the registers are first cleared (502) and the received data sequence is loaded into register 1 (504). The first switch is then closed momentarily (506) to move the information in register 1 to register 2. Switch 2 is then moved to position 1 (512), which is the convolution sequence associated with the spreading code of the first user. The despreading is then performed (514) for the first user in the ICU. Switch 3 is then moved to the first location (516) to accumulate the despread signal of user 1 in the output register 1 (518). In the meantime, the despread signal of user 1 is respread (520) and subtracted from the information in register 1 (522). The result of this subtraction is then used to update register 1 (522). Switch 2 is then moved to position 2 (532), which is the convolution sequence associated with the spreading code of the second user. The despreading is then performed (534), in the ICU on the data sequence associated with the second spreading code. Switch 3 is then moved to the second location (536) to accumulate the despread signal of spreading code 2 in the output register 2 (538). In the meantime, the despread signal of user 2 is respread (540) and subtracted from the information in register 1, and register 1 is updated (542). Switch 1 is then closed to move information in register 1 to register 2 (544). The previously described process (steps 512–540) is then repeated for spreading codes 3 and 4 (process 550, steps 552–560 and process 590, steps 572–580), followed by an update of register 1 in steps 562 to 582, respectively). Switch 1 is then closed to move the information in register 1 to register 2 (step, 584). The data sequence is now despread for all spreading codes in the first iteration/stage (590) and the whole process is repeated a second time (591) to account for the inaccuracy in the first stage. At the end of the two iterations/stages, the accumulated output is propagated (594) to other components in the system. The process is then repeated for other received data sequences for all the spreading codes. It is clear that the example provided above, is a HIC scheme detecting the first two spreading code's signals in parallel and cancelling their contribution concurrently. The signals of the next two spreading codes, 3 and 4, are also detected in parallel, and their contribution is canceled concurrently with each other. However, the group of spreading codes (group 1 having spreading codes 1 and 2, and group 2 having spreading codes 3 and 4) are detected and canceled successively.

However, in SIC schemes, each user's signal will be detected and its contribution canceled before the next user's signal is detected and its contribution canceled. Thus, a second user will detect its signal from a data sequence having the influence of the first user signal removed. In the PIC schemes, all users signals are detected and their contribution canceled concurrently. Thus, a second user will detect the same data sequence that the first user is detecting, and their influence on the data sequence is removed after all user signals are detected.

The receiver described with reference to FIGS. 3–5 requires less hardware complexity than conventional IC scheme receivers and provides better performance than conventional RAKE receivers. The receiver implemented according to the present invention reduces complexity but can require more processing time. Consequently, the receiver of the present invention may be used in systems were data is not received continuously and the increase in processing time does not affect the system. For example, the receiver can be used in Time Division Duplexing (TDD) systems where the downlink and uplink channels are separated in time (data transmission is not continuous), thus allowing the processing operations of the receiver to be performed during the idle transmission intervals ("spare time"). In general, the receiver according to the preferred embodiment of the present invention is preferably implemented in systems that adopt non-continuous data transmission schemes.

The receiver of the preferred embodiment of the present invention can accommodate oversampling. In this case, the vector of the correlation sequence $S_k$ will be longer, which will require faster operation execution.

As shown in the preferred embodiment of FIG. 3, the receiver has been realized using only one ICU with alternating correlation sequences $S_k$. The ICU may be implemented according to the embodiment mentioned above, with reference to FIG. 3, by performing the despreading and respreading using separate blocks (elements). In another preferred embodiment of the present invention, the ICU can perform both the despreading and the respreading operations using the same elements, as will be shown below with reference to FIGS. 6 and 7.

Figure 6:
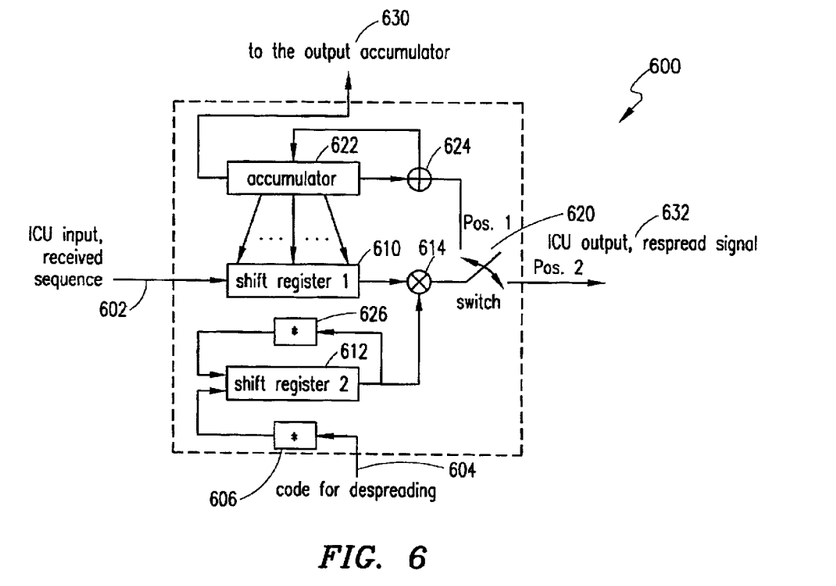
FIG. 6 illustrates an ICU having the same block used for despreading and respreading operations according to a preferred embodiment of the present invention.

FIG. 6 illustrates an ICU (600) in which the same elements are used for both the respreading and despreading operations according to a preferred embodiment of the present invention. The ICU (600) utilizes registers and switches, as shown in FIG. 6, to perform the despreading and respreading operations. The ICU (600) first receives the data sequence 602 which is loaded into register 1 (610). In the meantime, the complex conjugate (606) spreading code (604) corresponding to the desired user is loaded into register 2 (612). Register 1 shifts its contents out to be multiplied by the output-shifted contents of register 2. This shifting process is performed on a chip-wise basis to allow chip-wise multiplication of the contents using multiplier 614. The shifting operation is performed until the contents of the registers are all multiplied (the multiplication is performed a number of times equal to the length of the registers). The product of each chip-wise multiplication is added (624) to an accumulator after each multiplication. During this operation the switch 620 is moved to position 1. After the completion of the chip-wise multiplication operation and the accumulation of the multiplication product, the content of the accumulator, the despread data sequence, is fed to the output accumulator 630. At the same time as the accumulated value in 622 is fed to the output accumulator 630, the same accumulator content is loaded to all positions of register 1 (610). The respreading operation is then performed using the same hardware elements used in the above-mentioned despreading operation. A chip-wise multiplication 614 is then performed by multiplying the sequence in register 1 (610) with $S_k$ (626) contained in register 2 (612) to generate the respread symbol 632. The multiplication is a chip-wise multiplication that operates by shifting the contents of both registers out and multiplying the shifted output. The product of the multiplication is fed back by moving the switch 620 to position 2 to enable subtraction 330 from the received sequence. The operation is repeated for different user codes and for different stages as described above.

Figure 7:
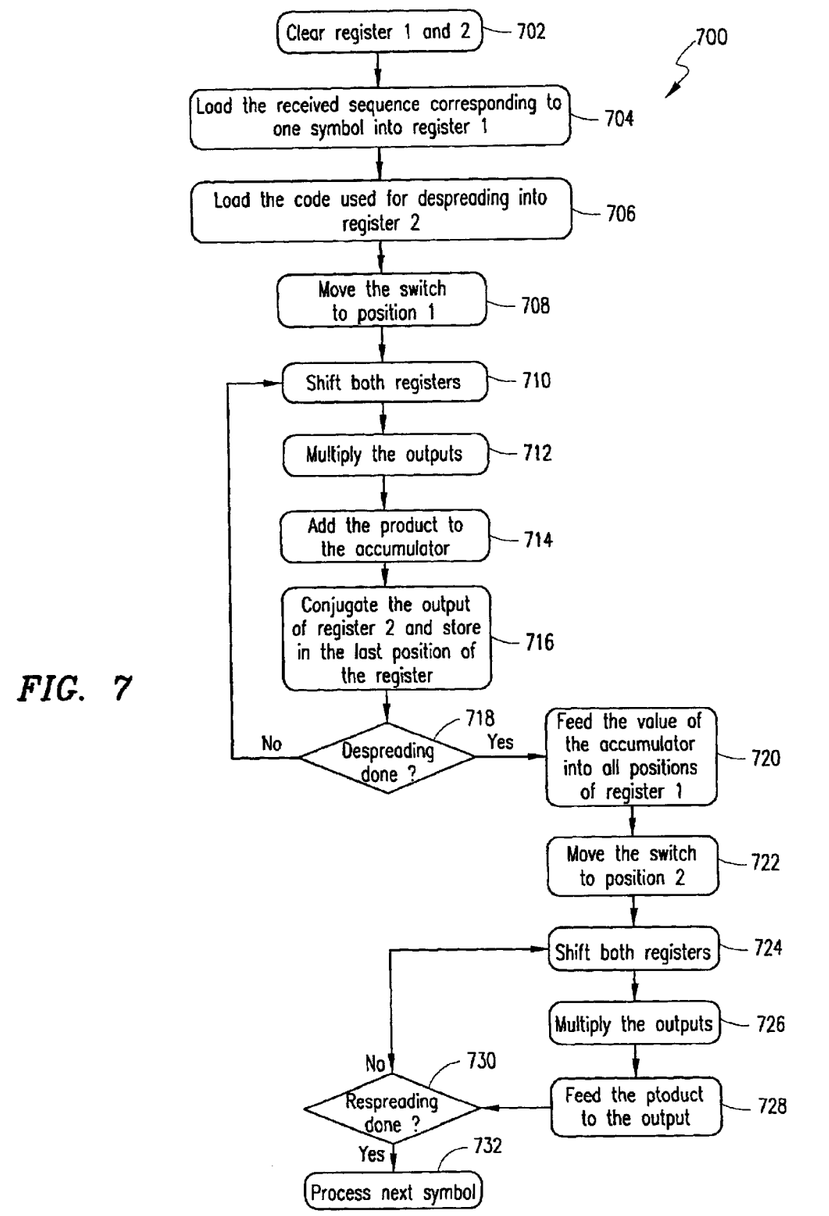
FIG. 7 is a flow chart illustrating the processing of a symbol in the ICU of FIG. 6.

FIG. 7 illustrates a flow chart of the symbol processing operation in the ICU shown in the preferred embodiment of FIG. 6. The registers, i.e., register 1 and 2 are first cleared (702). The received data sequence corresponding to one symbol (704) and the despreading code (706) are loaded into register 1 and register 2, respectively. The switch (e.g., 620) is then moved to position 1 (708). Both registers are shifted out (710), chip-wise multiplied (712), and the product is then added to the accumulator (714). In the meantime, register 2's output is complex-conjugated (716) and is stored in the last position of the register. The process is repeated for each position in both registers until the despreading is completed (718). After the despreading operation is completed, the accumulator loads its values into all positions of register 1 (720). The switch is then moved to position 2 (722) and the registers are shifted (724). Chips shifted out from the registers are multiplied by each other (726) and the product is fed to the output (728). The process is repeated for each chip contained in the registers until the respreading is completed (730). The whole process is then repeated for the next symbol (732).

As shown above, the receiver structure according to the teachings of the present invention, requires less hardware than conventional IC scheme receivers in a number of ways. The receiver is flexible, which allows the structure to realize different interference cancellation schemes, i.e., PIC, SIC or HIC, using the same hardware structure. Moreover, the interference cancellation operation may be performed using a single ICU. Additionally, the ICU may perform two or more functions using the same elements within the ICU. As is apparent, the hardware utilization efficiency is better in the present invention's flexible receiver implementation than in conventional IC scheme receivers. As such, these features described herein, in addition to other features described above with reference to the Figures, overcome the shortcomings of conventional IC scheme receivers and RAKE receiver structures.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A method for demodulating a data sequence, said method comprising:

identifying any one of a predetermined plurality of interference cancellation demodulation schemes;

loading the data sequence in a first register;

transferring the data sequence within the first register to a second register at predetermined time instances based upon the interference cancellation demodulation scheme identified;

despreading the data sequence in the second register using a user code;

respreading the despread data sequence;

updating the first register based upon the respread data sequence; and after said despreading, selectively accumulating the despread data sequences in an accumulator, the contents of said accumulator comprising the demodulated data sequences.

2. The method according to claim 1, further comprising:

repeating the steps of transferring, despreading, respreading, updating and selectively accumulating, a predetermined number of times.

3. An interference cancellation unit (ICU) for demodulating a data sequence, said ICU comprising:

a first shift register containing a data sequence, and a second shift register containing at least one code for a user associated with said data sequence; and a multiplier having inputs connected to outputs of said first and said second shift registers, said multiplier multiplying contents of said first and second shift registers, whereby said first shift register, said second shift register and said multiplier are controlled to perform despreading and respreading operations.

4. The ICU according to claim 3, further comprising:

a switch adapted to select an operation performed by said multiplier.

5. The ICU according to claim 3, further comprising:

an accumulator for accumulating the despread signal generated by said multiplier, said accumulator connected to the first shift register for supplying the despread signal to said first shift register during a respreading operation.

6. The ICU according to claim 3, wherein said second shift register stores the user specific code used for the despreading operation.

7. An interference cancellation method for canceling the interference on a data sequence, said method comprising the steps of:

receiving the data sequence;

detecting an estimate of a first spreading code's symbols from said data sequence using an interference cancellation unit (ICU);

storing the estimate of said first spreading code's symbols in a first register associated with said first spreading code's symbols;

detecting an estimate of a second spreading code's symbols from said data sequence;

storing the estimate of said second spreading code's symbols in a second register associated with said second spreading code's symbols; and subtracting signals associated with the estimate of said first spreading code's symbols and said second spreading code's symbols from said data sequence to produce a modified data sequence.

8. The interference cancellation method according to claim 7, further comprising, after said step of subtracting, the steps of:

detecting an estimate of a second spreading code's symbols from said data sequence;

storing the estimate of said second spreading code's symbols in a second register associated with said second spreading code's symbols; and subtracting a second signal associated with the estimate of said second spreading code's symbols from said modified data sequence.

9. The interference cancellation method according to claim 7, further comprising the steps of:

a second detecting step for detecting the estimate of said first spreading code's symbols from said modified data sequence using said ICU;

accumulating the estimate of said second detecting step of said first spreading code's symbols to said first register associated with said first spreading code's symbols; and subtracting a third signal associated with the estimate of said second detection of said first spreading code's symbols from said modified data sequence.

10. An interference cancellation system for canceling interference on a data sequence, said system comprising:

a first register and a second register for temporarily storing said data sequence;

a switch coupled between said first register and said second register for transferring said data sequence from said first register to said second register at predetermined time intervals;

an interference cancellation unit (ICU) coupled to an output of said second register for receiving the data sequence and detecting estimates of spreading codes's symbols;

output registers for storing the estimates of said spreading codes' symbols, each of said output registers being associated with one of said spreading codes symbols, said output registers being adapted to accumulate subsequent estimates said spreading codes' symbols; and subtraction means for subtracting signals associated with the estimates of said spreading codes' symbols from said data sequence, thereby removing the influence of the estimates of said spreading codes' symbols from said data sequence.

11. The system according to claim 10, wherein said signals associated with the estimates of said spreading codes' symbols are respread versions of the estimates of said spreading codes' symbols.

* * * * *